United States Patent
Klaassen et al.

(10) Patent No.: US 11,719,014 B2
(45) Date of Patent: Aug. 8, 2023

(54) COUPLING ASSEMBLY

(71) Applicant: Siemens Gamesa Renewable Energy A/S, Brande (DK)

(72) Inventors: Jacobus Klaassen, Voorburg (NL); Erwin de Jong, The Hague (NL)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/520,268

(22) Filed: Nov. 5, 2021

(65) Prior Publication Data
US 2022/0145657 A1    May 12, 2022

(30) Foreign Application Priority Data

Nov. 12, 2020  (EP) ..................................... 20207170

(51) Int. Cl.
| | |
|---|---|
| *E04H 12/08* | (2006.01) |
| *F03D 13/20* | (2016.01) |
| *E04H 12/34* | (2006.01) |
| *H02K 7/18* | (2006.01) |

(52) U.S. Cl.
CPC ......... *E04H 12/085* (2013.01); *E04H 12/342* (2013.01); *F03D 13/20* (2016.05); *H02K 7/1838* (2013.01); *F05B 2230/60* (2013.01)

(58) Field of Classification Search
CPC ..... E04H 12/085; F03D 13/20; H02K 7/1838; F05B 2230/60
USPC ........................................................ 411/429
See application file for complete search history.

(56) References Cited

U.S. PATENT DOCUMENTS

| | | | | |
|---|---|---|---|---|
| 8,915,043 | B2* | 12/2014 | Zheng | ..................... E04H 12/10 |
| | | | | 411/429 |
| 9,163,613 | B2* | 10/2015 | Martínez de Castañeda | ............... |
| | | | | F03D 13/10 |
| 9,651,029 | B2* | 5/2017 | Hayden | ................... E04H 12/08 |
| 2010/0080667 | A1 | 4/2010 | Reed | |
| 2011/0154757 | A1* | 6/2011 | Rosengren | .............. F03D 13/20 |
| | | | | 52/651.01 |
| 2013/0180199 | A1 | 7/2013 | Vadlamudi et al. | |
| 2016/0244104 | A1 | 8/2016 | Kuhm et al. | |
| 2018/0094621 | A1 | 4/2018 | Olsen et al. | |
| 2022/0002990 | A1* | 1/2022 | Klaassen | ............... E04H 12/342 |
| 2022/0003344 | A1* | 1/2022 | Klaassen | ............... F16L 23/032 |
| 2022/0049520 | A1* | 2/2022 | Hölscher | ................. E04H 12/12 |
| 2022/0082190 | A1* | 3/2022 | Haritou | ................. F16L 23/036 |

(Continued)

FOREIGN PATENT DOCUMENTS

| | | |
|---|---|---|
| DE | 10303366 A1 | 8/2004 |
| DE | 202018100604 U1 | 3/2018 |
| EP | 0911132 A2 | 4/1999 |

(Continued)

*Primary Examiner* — Andrew J Triggs
(74) *Attorney, Agent, or Firm* — Schmeiser, Olsen & Watts LLP (57) ABSTRACT

Provided is a coupling assembly of a wind turbine including a first coupling part and a second coupling part, the first coupling part and the second coupling part being configured to be coupled with each other, the first coupling part including a first surface with a first insertion hole being configured to be inserted by a fastener, the second coupling part including a second surface with a second insertion hole being configured to be inserted by the fastener, the first surface being configured to abut the second surface.

20 Claims, 8 Drawing Sheets

(56) References Cited

U.S. PATENT DOCUMENTS

2022/0145657 A1* 5/2022 Klaassen ................. F03D 13/20
2022/0195988 A1* 6/2022 Klaassen ................. F03D 13/10

FOREIGN PATENT DOCUMENTS

| EP | 3061675 A1 | 8/2016 |
| EP | 3372828 A1 | 9/2018 |
| EP | 3533999 A1 | 9/2019 |
| EP | 3868981 A1 | 8/2021 |
| EP | 3933146 A1 | 1/2022 |
| EP | 3933147 A1 | 1/2022 |
| NL | 1004960 C1 | 7/1998 |
| WO | 2018111505 A1 | 6/2018 |
| WO | WO 2020141333 A1 | 7/2020 |

* cited by examiner

COUPLING ASSEMBLY

CROSS-REFERENCE TO RELATED APPLICATIONS

This application claims priority to EP Application No. 20207170.0, having a filing date of Nov. 12, 2020, the entire contents of which are hereby incorporated by reference.

FIELD OF TECHNOLOGY

The following relates to a coupling assembly of a wind turbine comprising a first coupling part and a second coupling part. The following further relates to a method of coupling a first coupling part and a second coupling part of a coupling assembly of a wind turbine. Finally, the following also relates to a tower of a wind turbine comprising such a coupling assembly.

BACKGROUND

Wind turbines are increasingly used for the generation of electrical energy. A wind turbine typically comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor and rotates the shaft, thereby driving the generator to generate electricity.

The tower of a wind turbine typically comprises multiple tower sections to facilitate the transport of the tower from the production site to the installation site. These sections may be cylindrical, conical, or have another suitable shape. The sections are stacked and secured together at the installation site to form the tower of the wind turbine, allowing the wind turbine to reach a height above ground sufficient to provide clearance for the turbine blades at an altitude where there are sufficient wind velocities for adequate power generation.

A first tower section of a wind turbine may, for instance, be attached to an adjacent second tower section or to the nacelle by means of a coupling assembly. Alternatively, the first tower section may be attached to a so-called transition piece of the wind turbine by means of a coupling assembly, the transition piece connecting the tower to a support structure such as a monopile or a lattice structure in case of an offshore wind turbine. The coupling assembly comprises a first coupling part being the first tower section or a part rigidly attached to the first tower section, and a second coupling part being the adjacent second tower section, the nacelle or the transition piece of the wind turbine or a part rigidly attached to any of these components. Both coupling parts are fastened together by abutting a first surface of the first coupling part against a second surface of the second coupling part and inserting fasteners in the insertion holes of both coupling parts, thus forming the coupling assembly.

The first tower section typically comprises a flange, which can be configured to be joined to a flange of a second tower section. A coupling assembly with a first coupling part comprising a first flange and a second coupling part comprising a second flange is advantageous as it allows for the insertion of fasteners in the flanges after the two coupling parts are mounted together. The strength of a flange connection depends on various parameters, for example on the choice of the steel, the wall thicknesses, the bolt diameters, the number of bolts in the bolt circle, the load-path etc. Flanges with a T-shape, so called T-flanges, have proven to be resistant to higher loads as other flanges, such as L-flanges, i.e. flanges with an L-shape. The use of T-flanges and L-flanges to connect tower sections of a wind turbine is known from US 2013/0180199 A1.

Thus, to increase the strength of a flange connection between tower sections, one approach may be to use a T-flange, which has the shape of an inverted "T" with an inner flange extending into the tower interior and an outer flange extending outward from the tower. A T-flange may have around twice the strength of an L-flange, i.e. it can withstand loads around twice as great as the loads that could be withstood by a comparable L-flange. However, a major disadvantage of the T-flange is that it requires access from the outside of the tower as well as access from the tower interior. Although T-flanges account of a greater load-bearing capacity than L-flanges, the assembly and lifetime servicing of wind turbines with towers using T-flanges result in a significant extra cost.

Additionally, current developments of wind turbines tend to higher towers, towers with smaller diameters, and longer rotor blades, which result in loads in the tower higher than the ones which can be supported by L-flanges. Due to the increasing height and weight of the new-generation wind turbines, these flanges are not suited to support the load of some new-generation wind turbines.

The installation site has also a great effect on the load of the wind turbines. For the case of offshore wind turbines, there is a current trend to install the wind farms in deep sea waters, where there is a higher amount of wind but also harsh weather conditions. Similarly, for the case of onshore wind turbines and partly driven by new market expansions in development countries, wind farms might be installed in places with a higher typhon or earthquake probability. These harsh environmental conditions result in higher loads the wind turbines have to bear. Thus, the components of the wind turbines need to be robust enough to withstand these conditions.

A further flange type being able to support higher loads than L-flanges are X-flanges. Thus, X-flanges are suited to support the load of new-generation wind turbines. A first concept of an X-flange connection is described in NL 1004960 C1.

XL-flanges are also flanges being able to support the load of new-generation wind turbines, their shape resulting from a combination of X-flanges and L-flanges, i.e. a flange with an L-circle of apertures (often an inner circle) and a region of X-shaped apertures. Thus, the XL-flange is a special variant of the X-flange, where the L-part serves between other purposes as an interface for attachment of equipment.

New-generation wind turbines have increased in size compared to the older ones. Hence, not only the tower might be formed of a plurality of sections. Due to the increased size of the equipment like generator, gearbox, power electronics or the like, other functional parts can also be formed of a plurality of sections to facilitate the transport and assembly of wind turbines. The nacelle is an example of a further functional part of a wind turbine which can be formed of a plurality of sections. Nacelles are usually provided with a canopy structure surrounding the interior of the nacelle, wherein the canopy structure comprises a plurality of panels which are attached to a nacelle support structure. The connection of the panels of the canopy structure can be made by means of a coupling assembly. This is typically done by panels comprising flanges attached together. An example of a nacelle with a canopy structure comprising a plurality of panels joint together by flanges can be found in EP 3 533 999 A1 and in EP 3 372 828 A1.

Wind turbines are placed at locations providing high wind amounts. Hence, as the weather conditions are often rough at the wind turbine locations, the wind turbines must withstand these rough conditions throughout their lifetime. Particularly during installation, but also during operation, transportation, and storage, the wind turbine is exposed to rain, i.e. water, as well as to dust and dirt, which results in a faster deterioration of the materials. Additionally, for offshore wind turbines, the wind turbines' materials may be affected by a faster rate of corrosion due to the high amount of salt in the air. Due to these reasons, the wind turbines have an increased wear at these locations, increasing the overall costs of the wind turbines due to the need for a regular maintenance.

For wind turbines with functional parts comprising a plurality of sections, the coupling assemblies connecting these sections are critical points which can be heavily affected by the weather conditions. For example, a coupling assembly connecting a first tower section to a second tower section is a critical point due to the plurality of components joint together, as water and dirt can accumulate in the components or between the components.

Coupling assemblies comprise insertion holes used to fasten a first coupling part to a second coupling part of the coupling assembly. Insertion holes are critical points of coupling assemblies which can be heavily affected by the weather conditions. Particularly during the installation of the wind turbines, the insertion holes of the coupling parts are exposed to the harsh environmental conditions which are usually present at the wind turbine locations. This results in a premature wear of the coupling assembly. Water, salt, dust, and dirt collection in the insertion holes can lead to corroded threads, which impede the studs or other fasteners from being inserted in the insertion holes and correctly fastened. Additionally, corrosion can lead to cracking and failure of threads in insertion holes, especially in blind holes. Thus, dirty insertion holes retard the installation and result in a faster deterioration of the materials due to an increased wear.

Blind holes are particularly critical to an exposure to harsh weather conditions. If dirt, dust, salt and/or water gets inside a blind hole during the installation of a wind turbine, it will not be able to flow out of the blind hole by itself, leading to a faster corrosion of the coupling parts comprising blind holes.

The use of plugs to seal holes is known. For example, the use of plugs to close holes which are not utilized in the chassis or body of vehicles is known from the documents WO 2018 111 505 A1, EP 3 061 675 A1, DE 10 303 366 A1, and EP 0 911 132 A2. This is done to avoid resonances inside the hole, which can lead to vibrations, or the introduction of water and dirt. However, the holes are not directly exposed to harsh weather conditions such as the ones of wind turbines, as they are drilled at parts of the vehicles not directly visible to the user and thus properly covered by other parts of the vehicle. Thus, it is not critical for the vehicle's integrity to cover the holes, as the lifespan of the vehicle is not influenced by this measure. On the contrary, not covering the holes of wind turbines can lead to a very fast deterioration of the coupling assemblies comprising open holes, which directly impacts the lifespan of the wind turbine.

Replacement of wind turbine parts can be very costly. For the case of X-flanges or XL-flanges, the forging of these shapes compared to other flanges requires more steel and therefore more raw material cost. Additionally, the costs of disassembling and replacing the damaged flange and the losses due to non-operation of the wind turbine during the replacement are high. However, by saving on maintenance costs and not improving the coupling assembly, wear and damages of the coupling assembly might not be detected on time, which can result in a total damage of the turbine.

SUMMARY

An aspect relates to provide an improved concept for coupling a first coupling part and a second coupling part of a coupling assembly that overcome the problems described above.

A coupling assembly of a wind turbine according to embodiments of the invention comprises a first coupling part and a second coupling part. The first coupling part and the second coupling part are configured to be coupled with each other. The first coupling part comprises a first surface with a first insertion hole, which is configured to be inserted by a fastener. The second coupling part comprises a second surface with a second insertion hole, which is configured to be inserted by the fastener. The first surface is configured to abut the second surface.

According to embodiments of the invention, a cover covers the first and/or second insertion hole. Hence, the cover covers the first insertion hole of the first surface of the first coupling part. Alternatively, the cover covers the second insertion hole of the second surface of the second coupling part. Alternatively, one cover covers the first insertion hole of the first surface of the first coupling part and another cover covers the second insertion hole of the second surface of the second coupling part. Covering the insertion holes of the coupling assembly is a cost-effective solution to prevent water and dirt to enter the insertion holes before the fastener is inserted during the installation of the coupling assembly at the installation site. The cover should be robust enough to stay intact during transportation and storage.

Thus, the main benefit of using a cover is to protect the coupling assembly from corrosion, which ensures the structural integrity of the joint. If not protected, the insertion holes can corrode, leading to service repairs which may be costlier than providing the cover at the first place.

According to embodiments of the invention, the first coupling part comprises a first surface with a first insertion hole. The first insertion hole can be a blind hole, which terminates on the body of the first coupling part. Alternatively, the first insertion hole can be a through-hole, which extends all the way through the body of the first coupling part.

If a blind hole of a first coupling part interacts with a through-hole of a second coupling part or vice versa, i.e. by being fastened by a single fastener introduced in both insertion holes, the resulting insertion hole after coupling the parts together is a blind hole.

If a through-hole of a first coupling part interacts with a through-hole of a second coupling part, i.e. by being fastened by a single fastener introduced in both insertion holes, the resulting insertion hole after coupling the parts together is a through-hole.

Thus, the term blind hole can be understood as an insertion hole which terminates in the body of the part where it is drilled, but also as an insertion hole which interacts with another insertion hole and has only one opening, thus terminating in the body of the coupled parts.

According to embodiments of the invention, the second coupling part comprises a second surface with a second insertion hole. The second insertion hole can be a blind hole, which terminates on the body of the second coupling part.

Alternatively, the second insertion hole can be a through-hole, which extends all the way through the body of the second coupling part.

Blind holes can have an internal thread to receive a threaded fastener, such as a metal screw for fastening the first coupling part to the second coupling part. The blind hole can have the internal thread at the end of the insertion hole. This is advantageous, as the fastener is first inserted and centered through the unthreaded part of the blind hole and subsequently fastened through screwing the fastener to the blind hole, thus decreasing the possibility of damaging the opening of the insertion hole or of the thread.

Through-holes can also have an internal thread to receive a threaded fastener, such as a metal screw for fastening the first coupling part to the second coupling part.

The first surface of the first coupling part can comprise a plurality of first insertion holes. The second surface of the second coupling part can comprise a plurality of second insertion holes.

According to an embodiment of the invention, a single cover can cover a single insertion hole. This is advantageous to assure that the cover is properly inserted in the insertion hole. According to another embodiment of the invention, a plurality of covers can cover a plurality of insertion holes. Thus, a single cover covers a single insertion hole and this is valid for a plurality of insertion holes. This is advantageous to assure that each cover is properly inserted in each insertion hole and that multiple insertion holes are protected by covers.

According to another embodiment of the invention, a single cover can cover a plurality of insertion holes. This eases the production of the coupling parts, as the covering of the plurality of insertion holes can be done in one step instead of covering one insertion hole after the other in multiple subsequent steps, reducing the production costs.

The first insertion holes of the first coupling part are covered independently of the second insertion holes of the second coupling part. That means that one cover or a plurality of covers cover the first insertion holes and a further cover or a plurality of covers cover the second insertion holes.

According to an embodiment of the invention, the first coupling part can further comprise a first flange. The first surface of the first coupling part is a face of the first flange. The first flange is a part of a structural component of the wind turbine, such as the tower section, the nacelle or the transition piece. The first flange can be used to couple one structural component to another one, such as the connection of the first tower section with the transition piece, the connection of the last tower section with the nacelle or connections of the transition piece or of the nacelle with other parts. If the transition piece or the nacelle comprises multiple sections coupled together, the first coupling part of the coupling assembly can be the first flange of one of these sections and couple the section with an adjacent section.

The first flange of the first coupling part of the coupling assembly can be a separate part of the structural component. In this case, the first flange is releasably connected to the structural component by a semi-permanent joining method, such as bolts, rivets, screws or other known joining methods. For example, the first flange can be mounted on a tower section by a nut-bolt connection.

The first flange of the first coupling part of the coupling assembly can also be integral with the structural component, which means that the structural component and the first flange are formed as a single body. An integral connection can be achieved with permanent joining methods such as welding, which permanently join the surfaces of individual components together to create a single component which cannot be separated into the original individual components without considerable damage. An integral connection can also be achieved during the production of the tower section. In this case, the casting mold comprises both the shape of the tower section as well as the shape of the first flange. Thus, the casting of the tower section produced already comprises the first flange.

According to an embodiment of the invention, the second coupling part can further comprise a second flange. In this case, the second flange can be a complementary flange suited for being coupled with the first flange of the first coupling part of the coupling assembly. The terms "flange" and "complementary flange" are to be understood in the usual sense to mean flanges that are suited to be coupled to each other.

If the second coupling part comprises a second flange, then the second surface of the second coupling part is a face of the second flange. The second flange is a part of a structural component of the wind turbine, such as the tower section, the nacelle or the transition piece. The second flange can be used to couple one structural component to another one, such as the connection of the first tower section with the transition piece, the connection of the last tower section with the nacelle or connections of the transition piece or of the nacelle with other parts. If the transition piece or the nacelle comprise multiple sections coupled together, the second coupling part of the coupling assembly can be a second flange of one of these sections.

The second flange of the second coupling part of the coupling assembly can be a separate part of the structural component. Alternatively, the second flange of the second coupling part of the coupling assembly can be an integral part of the structural component.

An example of a flange connection for coupling assemblies are XL-flange connections. XL-flange coupling assemblies are typically formed of a first XL-flange and a second XL-flange, each flange having a plurality of blind holes and a plurality of through-holes configured to be coupled by fasteners.

The first coupling part and the second coupling part of the coupling assembly are coupled by means of a fastener, such as a bolt, screw, pin, rivet, thread, stud or other longitudinal fastener used for fastening.

The fastener is a separate part of the first coupling part and of the second coupling part of the coupling assembly.

During the installation of the coupling assembly, the fastener is inserted in both the first insertion hole of the first coupling part and the second insertion hole of the second coupling part to couple the first coupling part to the second coupling part and form the coupling assembly.

Alternatively, the fastener can already be pre-installed in the first insertion hole of the first coupling part. In this case, during the installation of the coupling assembly, the fastener is then inserted in the second insertion hole of the second coupling part to couple the first coupling part to the second coupling part and form the coupling assembly.

Alternatively, the fastener can already be pre-installed in the second insertion hole of the second coupling part. In this case, during the installation of the coupling assembly, the fastener is then inserted in the first insertion hole of the first coupling part to couple the first coupling part to the second coupling part and form the coupling assembly.

Open blind holes are more critical than through-holes as water, salt, dust and/or dirt collected inside cannot flow out of the insertion hole. However, the problem is not limited to open blind holes, as through-holes can collect water, salt, dust and/or dirt inside as well. For example, if the through-hole is drilled with an inclination or if it has an inner-thread, it is as well prone to collect dirt.

This problem affects XL-flanges of tower sections, but the problem is not limited to this type of flanges. In fact, any structural component comprising insertion holes might be affected by water, salt, dust, and/or dirt collected inside the hole.

Blind holes pointing upwards are particularly critical, as they act as a 'rain gauge'. Such blind holes are arranged, for the example of an offshore wind turbine, typically at the connection of the tower with the transition piece. Other structural components with a coupling assembly might encounter the same problem.

The cover may also be applied only to blind holes. This is advantageous, as blind holes are critical as water cannot escape from them. Particularly, blind holes pointing upwards are very critical at exposure to environmental conditions such as rain or dust, so the cover may also be applied only to blind holes facing up.

The cover may also be applied only to through-holes, as dust or dirt can be collected inside them before installation when facing adverse environmental conditions.

According to an embodiment of the invention, an adhesive layer is used as the cover. This adhesive layer can be removed before inserting the fasteners in the insertion hole.

According to another embodiment of the invention, a plug is used as the cover. Plugs can be used to protect the insertion holes of the coupling assembly by covering the openings of the insertion holes and sealing off the insertion hole. These plugs can be made of a resilient material, such as rubber or plastic, that allows the plug to flex, while at the same time providing a fluid-tight barrier.

According to another embodiment, the cover is glued to the surface. A glued cover has increased sealing properties and the chance of the cover falling out is reduced. For example, a plug or an adhesive layer can be glued to the first surface or to the second surface. For the case of a plug, it can also be glued to the interior of the insertion hole.

In an embodiment, the diameter of the opening of the first and/or second insertion hole is enlarged so that the plug can sit in the opening inside the first and/or second insertion hole. Hence, the first and/or second insertion hole is configured to be inserted by the plug. The benefit of this approach is that the plug cannot slide into the hole. Additionally, it does not reduce the diameter of the shank hole, so this measure does not affect the tolerances of the stud shank to the wall surface of the insertion hole.

The plug is configured to cover an insertion hole. Hence, the plug can comprise a planar annular collar configured to abut an inner surface of the insertion hole for the case when the insertion hole is enlarged so that the plug can sit in the opening inside the insertion hole.

The plug can be shaped as a disc. This is a cost-effective and advantageous way to cover insertion holes. If the opening of the insertion hole is enlarged for the plug to sit in the opening, then one face of the ring abuts the inner surface of the insertion hole, avoiding the ring to fall inside the insertion hole.

The plug can further comprise a plugging protuberance extending from the collar. Hence, the plug can have a nose that is dome-shaped. This nose or protuberance is helpful in order to center the plug and for a better grip of the plug in the insertion hole.

A disadvantage of using plugs or adhesive layers according to the above-mentioned embodiments is that they must be removed to be able to insert the fastener in the insertion holes. Removing the plugs before or during installation will temporarily expose the insertion holes to environmental conditions. For the case of tower section assembly, removing the plugs just before the tower sections are joined together will lead to health and safety issues, as the workers work under suspended load, and the work time for the installation of the turbine increases. Additionally, this leads to a higher weather exposure of the open parts during installation.

According to an embodiment of the invention, the cover is configured to be punched by the fastener during fastening. The insertion of the fastener in the insertion hole is done during the installation of the wind turbine, when, for example, two adjacent tower sections are coupled together by means of the coupling assembly. During the coupling process, the fastener is inserted in the insertion hole of the first coupling part and/or of the second coupling part by punching the cover, so that the insertion hole remains sealed until the coupling assembly is coupled. Hence, between the time when the coupling parts are produced in the production site and the time when they are coupled at the installation site, these parts are protected against humidity, dirt or dust. Afterwards, when the fastener is inserted, the fastener itself, together with the surface of the coupling parts, seal the insertion hole, so the critical points of the coupling assembly are protected at all times.

A benefit of using a punch-through cover, i.e. a cover configured to be punched, is that it is not needed to remove the cover during the installation of the tower and of other functional parts. This ensures that the insertion holes are protected throughout the installation and that the installation time is reduced, as the covers can stay in place during and after the fastening of the coupling assembly. Additionally, the health and safety of the workers are improved, as the step of removing the plugs is not necessary, reducing the installation time, as well as the time working near or under suspended load.

According to another embodiment, the cover is configured to be punched by a puncher before coupling the coupling parts together. This puncher is a different component than the fastener used for fastening the coupling parts together. The puncher can be a bar, a pin or another longitudinal tool configured to punch the cover before inserting the fastener in the insertion hole. This is advantageous, as the insertion hole is protected until it is punched, which is usually before introducing the fastener in the insertion hole.

A punch-through cover can be sealed to the insertion hole with an adhesive, such as glue. The punch-through cover can be sealed inside the insertion hole or over the insertion hole. Alternatively, the punch-through cover can be pressed against the insertion hole so that it is blocked inside. Alternatively, the punch-through cover can be configured to melt and/or expand when heated to seal and securely couple to the insertion hole.

In order to assure the protection of the insertion holes throughout the transportation, storage, and installation, the punch-through cover can be applied during production in the production site. Alternatively, the cover can be applied before installation of the tower, before the coupling parts are exposed to the harsh weather conditions of the installation site.

A punch-through cover should be robust enough to stay intact during transportation and storage and during the installation process. Additionally, it should also be configured for fasteners or other punching means to be able to punch through during installation of the coupling assembly. Suitable materials for the cover are plastics, such as PE or rubber, or aluminum, i.e. thin aluminum sticker patches or aluminum plugs.

According to an embodiment, the punch-through cover has a weakened central area configured to break during punching. The weakened central area can be accomplished by precuts and/or by decreasing the thickness of the cover at specific points in the central region of the cover. Alternatively, the weakened central area can be accomplished by an internal cavity in the cover. A weakened central area is advantageous when the fastener impacts the surface and is inserted in the insertion hole, as then the cover breaks more easily.

According to yet another embodiment, a punch-through adhesive layer is used as the cover. This adhesive layer can be glued on the surface of the coupling part. The adhesive layer can remain glued on the surface after installation. The adhesive layer covers one or a plurality of insertion holes.

To protect the cover from being damaged during transportation, storage, or installation, the first surface and/or the second surface can comprise a recess enclosing one or a plurality of insertion holes. This recess protects the regions around the insertion holes from objects hitting or being mounted to the coupling parts' contact surface. Additionally, in this recess the cover can be fixed, thus, it enhances the attachment of the cover. Additionally, this recess is useful for ensuring a well-defined contact area for the first surface and the second surface. The well-defined contact area prevents a local bump from occurring which could negatively impact the load path.

A surface with a recess is particularly useful if an adhesive layer is used as a cover, as the recess prevents the adhesive layer from being detached from the surface. However, if the layer is thin enough, a recess may not be required.

A surface with a recess is particularly useful if the cover comprises a weakened central area, as the recess prevents objects from undesirably hitting the weakened central area of the cover, thus resulting in a cover break before the time when the cover is voluntarily punched during installation of the coupling assembly. This can be particularly useful during transportation or storage, where an object might hit the coupling parts, resulting in a cover break.

According to an embodiment, a punch-through plug is used as the cover. This punch-through plug can be permanently inserted into the insertion hole. The benefits of using a plug to cover insertion holes were already mentioned before. This embodiment combines these advantages with the advantages of having a plug configured to be punched.

According to another embodiment, the diameter of the opening of the insertion hole is enlarged so that the plug can sit in the opening inside the insertion hole. This is advantageous, as the plug can be inserted completely in the insertion hole, preventing the plug to fall out of the hole during transportation and storage or before coupling the tower sections. Additionally, if the plug sits on an enlarged diameter at the opening of the insertion hole, it does not move during transportation or during the punching by the fastener, as the enlarged surface prevents the plug from falling inside the insertion hole. For this, the plug should have a similar outer diameter as the enlarged diameter of the insertion hole. For the case of through-holes, both openings of the insertion hole can be enlarged.

The opening of an insertion hole can be enlarged either by drilling along the angle of the hole or perpendicular to the surface, leading to two types of plug geometries.

A loose or detached cover might slip and block the thread engagement between the fastener and the internal thread. However, a plug being pushed in the insertion hole, a so-called interference fit, or being glued ensures that the cover does not slip. An advantage of using a plug is that it stays in place after being pushed in the insertion hole. The use of a plug is a simple and robust solution for covering insertion holes.

According to an embodiment, at least one punch-through plug is attached to a punch-through adhesive layer to cover the insertion holes. This combination allows to securely fix the plug in the insertion hole. Additionally, if a plurality of insertion holes are to be covered, then a single adhesive layer can comprise a plurality of plugs attached to it, which can reduce the production time, as the multiple plugs attached to the adhesive layer can be inserted faster and more easily into the insertion holes. For example, the adhesive layer with the plurality of plugs can be inserted in one production step instead of subsequently inserting plugs in the plurality of insertion holes, considerably reducing the production time. This embodiment also prevents the adhesive layer to slip and block the thread engagement between the fastener and the internal thread of the insertion holes, as the insertion holes are covered by the plugs themselves.

Another aspect of embodiments of the invention relates to a method of coupling a first coupling part and a second coupling part of a coupling assembly of a wind turbine, the first coupling part and the second coupling part being configured to be coupled with each other, the first coupling part comprising a first surface with a first insertion hole being configured to be inserted by a fastener, the second coupling part comprising a second surface with a second insertion hole being configured to be inserted by the fastener, the first surface being configured to abut the second surface, the first and/or the second insertion hole being covered by a cover, comprises the steps of bringing the first surface and the second surface together, so that the first surface abuts the second surface, punching the cover, and fastening the first coupling part and the second coupling part with the fastener.

The cover of this embodiment can be punched by the fastener or by a puncher.

The fastening of the first coupling part and the second coupling part with the fastener is done by inserting the fastener through both a through-hole of one coupling part and a through-hole or a blind hole of the other coupling part. If the fastener is introduced through a through-hole of the first coupling part and a blind hole of the second coupling part, the blind hole of the second coupling part usually has an inner thread which enables to fasten the fastener and couple the first and second coupling parts together. A nut can then be used at the opening of the resulting blind hole to fasten both coupling parts together. Alternatively, if the fastener is introduced through two through-holes, one from the first coupling part and one from the second coupling part, then the fastener can be attached either by an inner thread of the through holes and/or by a nut at both openings of the resulting through-hole.

Yet another aspect of embodiments of the present invention relates to a tower of a wind turbine comprising a first and a second tower section, the first tower section being coupled to the second tower section by means of a coupling assembly, the first coupling part being the first tower section and the second coupling part being the second tower section, the first coupling part comprising a first surface with a first insertion hole being configured to be inserted by a fastener, the second coupling part comprising a second surface with a second insertion hole being configured to be inserted by a fastener, the first surface being configured to abut the second surface, the first and/or the second insertion hole being covered by a cover and having been punched by the fastener or by a puncher, the fastener being inserted through both the first insertion hole of the first surface pertaining to the first tower section and the second insertion hole of the second surface pertaining to the second tower section.

BRIEF DESCRIPTION

Some of the embodiments will be described in detail, with reference to the following figures, wherein like designations denote like members, wherein.

DETAILED DESCRIPTION

Figure 1:
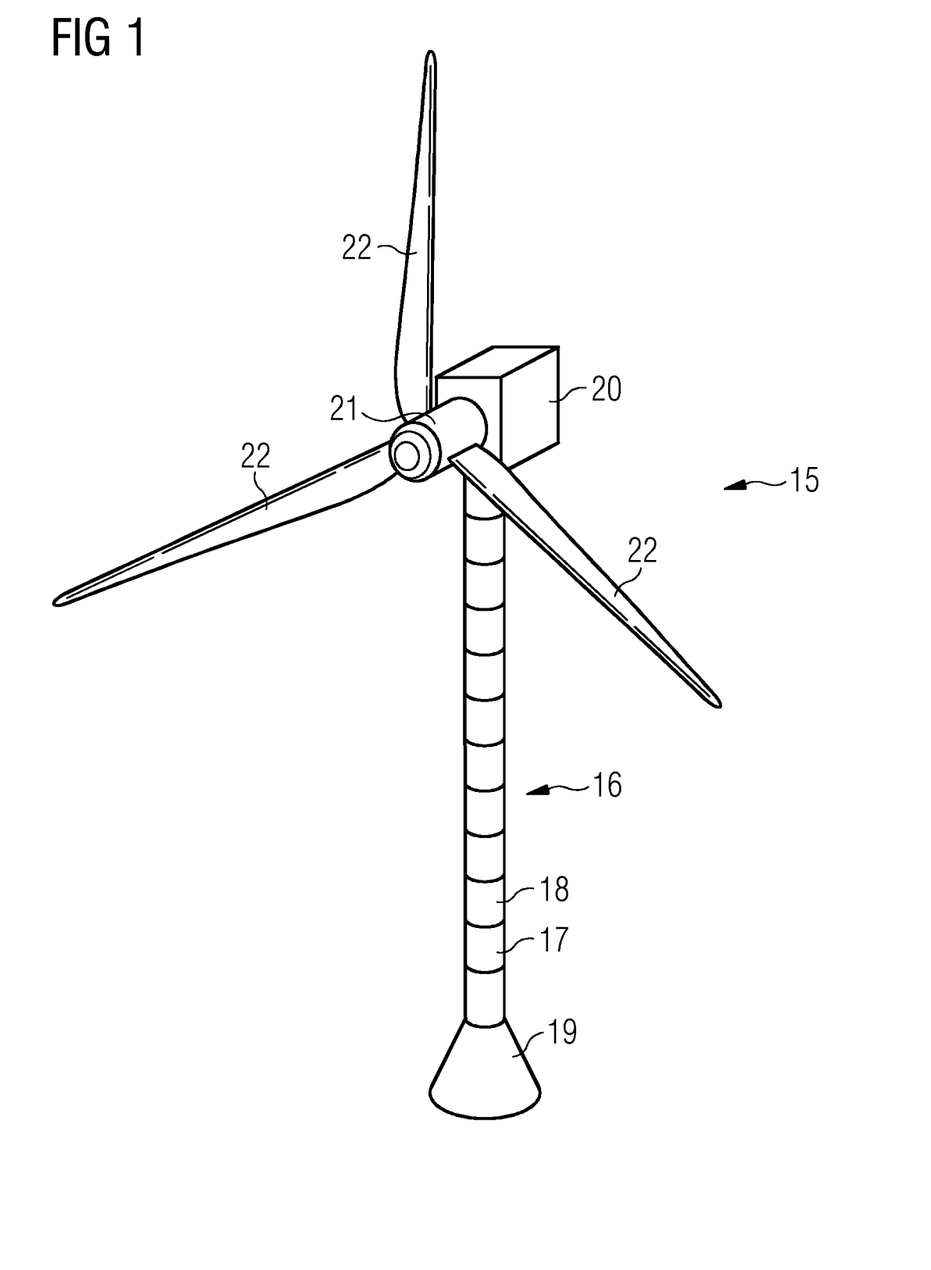
FIG. 1 shows a perspective view of a wind turbine.

FIG. 1 shows a wind turbine 15. The wind turbine 15 comprises a hub 21 connected to a generator (not shown) arranged inside a nacelle 20. The hub 21 comprises three wind turbine blades 22. The nacelle 20 is arranged at an upper end of a tower 16 of the wind turbine 15. The tower 16 comprises multiple tower sections 17, 18. The tower 16 is mounted on a transition piece 19.

Figure 2:
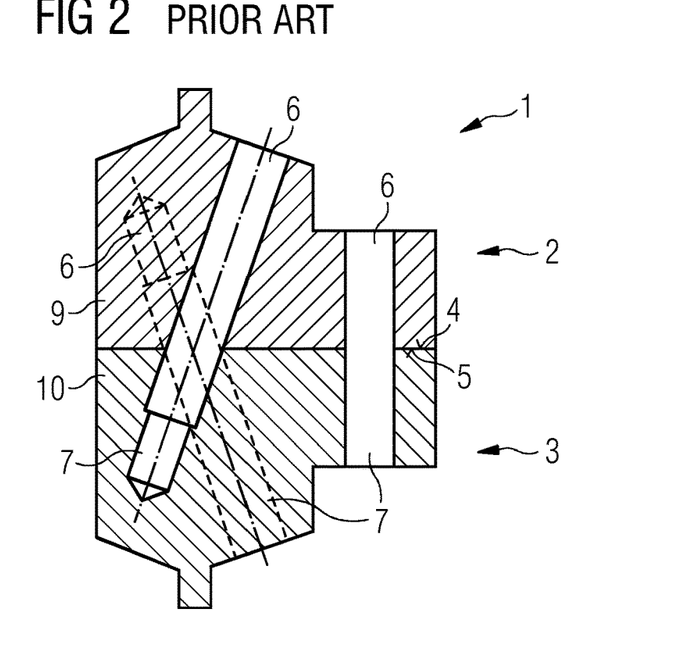
FIG. 2 shows the coupling assembly at the installation step before coupling the parts with the fastener according to the conventional art.
Figure 3:
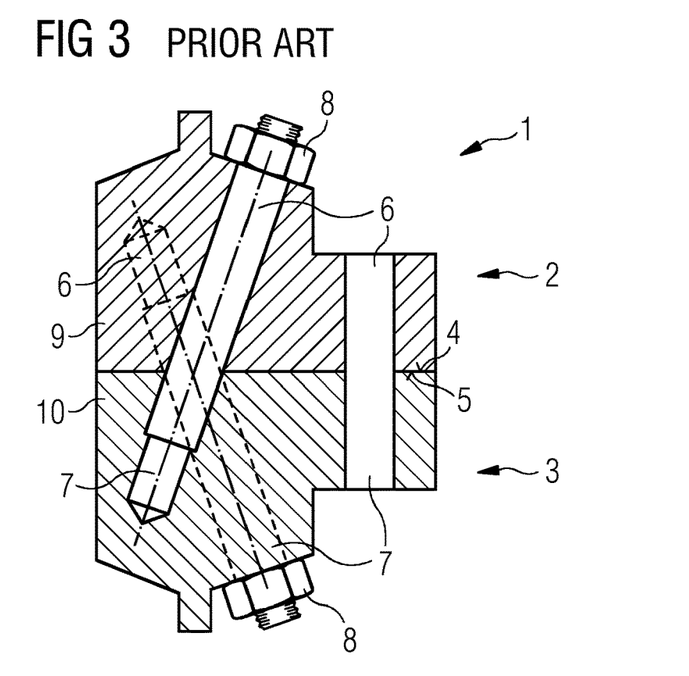
FIG. 3 shows a coupling assembly comprising XL-flanges according to the conventional art.

FIGS. 2 and 3 show a cross-section of a coupling assembly 1, comprising a first coupling part 2 and a second coupling part 3. FIG. 2 shows the coupling assembly 1 at the installation step before coupling the parts with the fastener 8 and FIG. 3 shows the coupling assembly 1 already coupled by one fastener 8.

The first coupling part 2 is a first flange 9 of the upper part of the coupling assembly 1. The second coupling part 3 is a second flange 10 of the lower part of the coupling assembly 1. For fastening both coupling parts 2, 3 together, a first surface 4 of the first coupling part 2 abuts a second surface 5 of the second coupling part 3.

In the cross-section shown, the first flange 9 of the first coupling part 2 has two first insertion holes 6, which are through-holes and the second flange 10 of the second coupling part 3 has a second insertion hole 7, which is a blind hole and a further second insertion hole 7, which is a through-hole. When the first surface 4 abuts the second surface 5, the left through-hole of the first flange 9 interacts with the blind hole of the second flange 10 and a blind hole results from both insertion holes 6, 7 of the coupling assembly 1. Thus, when the coupling assembly 1 is fastened, the cross-section of the coupling assembly 1 has a blind hole and a through-hole. The blind hole of the coupling assembly 1 is an inclined insertion hole.

Figure 4:
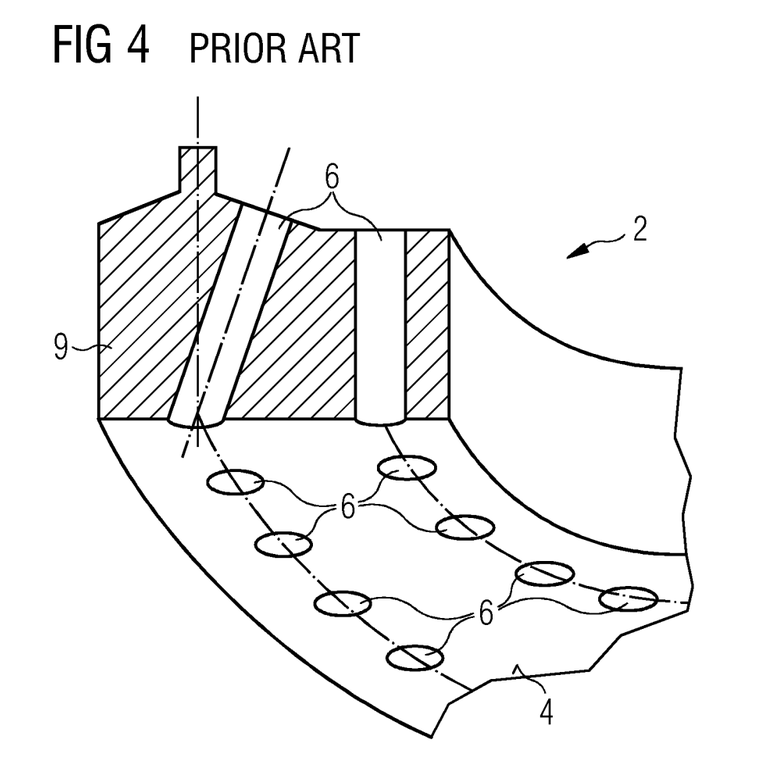
FIG. 4 shows a perspective view on a cutout of an XL-flange according to the conventional art.

FIG. 4 shows the first flange 9 of the first coupling part 2 of FIG. 2. As a stand-alone piece, the cross-section of the first flange 9 depicted in FIG. 4 shows two through-holes, which are the first insertion holes 6. However, as seen in FIG. 2, the left through-hole of the first flange 9 will become a blind hole of the coupling assembly 1 if combined with the corresponding second flange 10, which has a blind hole at the left part of the cross-section. In order to achieve this, every second first insertion hole 6 of the left part of the first flange 9 is configured as a blind hole and the rest of the first insertion holes 6 are configured as through-holes. When coupling the first coupling part 2 and the second coupling part 3 of the coupling assembly 1 together, the first coupling part 2 is rotated along the axis of the first flange 9 by a degree being equal to the angle separation of one insertion hole to the next one of the left part of the first flange 9. Hence, through this rotation of the first flange 9 in respect to the second flange 10, at the left part of both flanges a through-hole of the first flange 9 will always interact with a blind hole of the second flange 10 and vice versa, resulting in blind holes at the left part of the coupling assembly 1.

Figure 5:
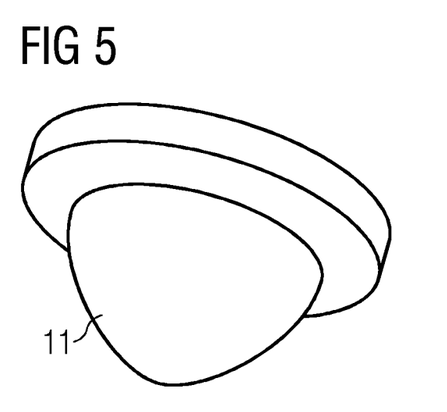
FIG. 5 shows a cover configured as a plug to cover the first and/or second insertion hole.

FIG. 5 shows a cover 11 configured as a plug to cover the first and/or second insertion hole 6, 7. The plug comprises a planar annular collar configured to abut a first inner surface of the insertion hole 6, 7 and a plugging protuberance extending from the collar. Hence, the plug has a nose that is dome shaped. This nose is helpful in order to center the plug and for a better grip of the plug in the insertion hole 6, 7. This cover 11 can be configured to be punched during the installation of the wind turbine 15.

Figure 6:
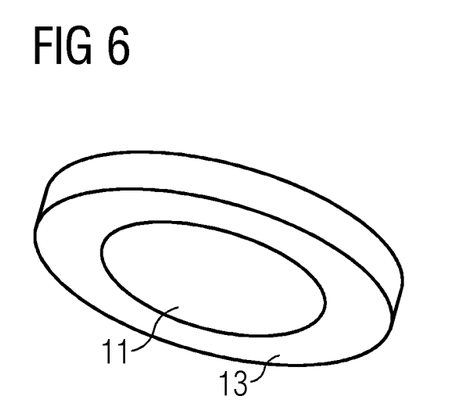
FIG. 6 shows a cover configured as a punch-through plug to cover an insertion hole.

FIG. 6 shows a cover 11 configured as a punch-through plug 13 to cover an insertion hole 6, 7. An internal cavity extends axially inwards from one surface of the punch-through plug 13. Hence, the cover 11 has the shape of a disc with an internal cavity. The internal cavity weakens the central area of the punch-through plug 13, making it easier to punch the punch-through plug 13 during installation. It is also possible to have a disc without the internal cavity.

Figure 7:
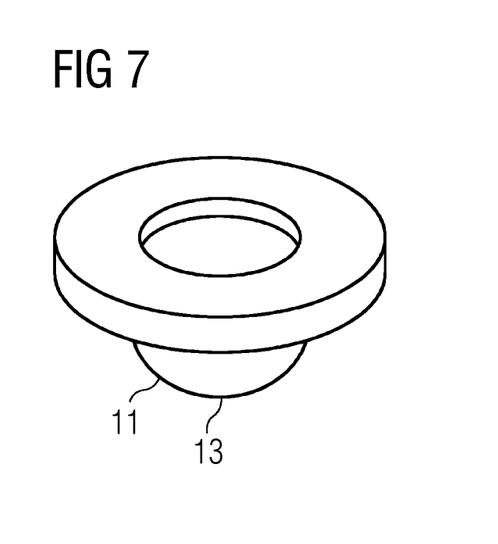
FIG. 7 shows three different embodiments of covers configured as plugs.

FIG. 7 combines the features of both embodiments of the plugs shown in FIG. 5 and FIG. 6. In this embodiment, the internal cavity is arranged from the face of the punch-through plug 13 being at the surface level of the opening of the insertion hole 6, 7. This internal cavity is helpful in order to center the fastener 8, as the fastener 8 can be introduced in the internal cavity before punching the punch-through plug 13.

Figure 8:
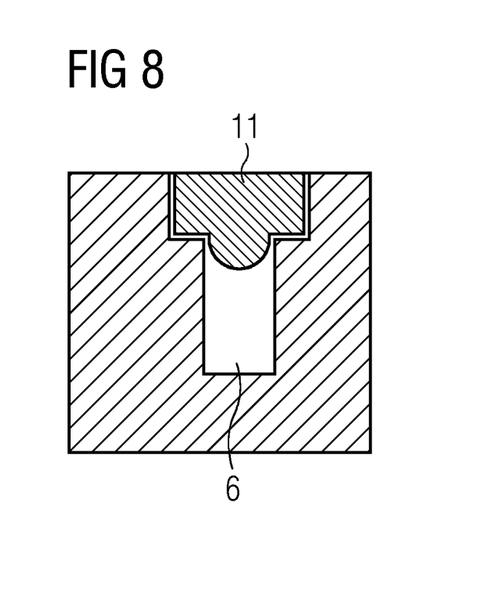
FIG. 8 shows a schematic view of the cross-sections of the plug shown in FIG. 5.
Figure 9:
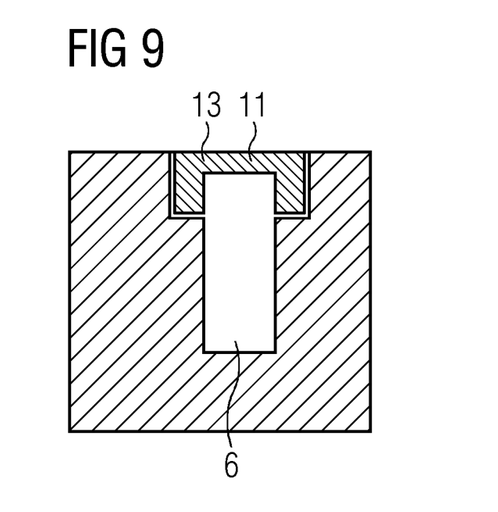
FIG. 9 shows a schematic view of the cross-section of the plug shown in FIG. 6.
Figure 10:
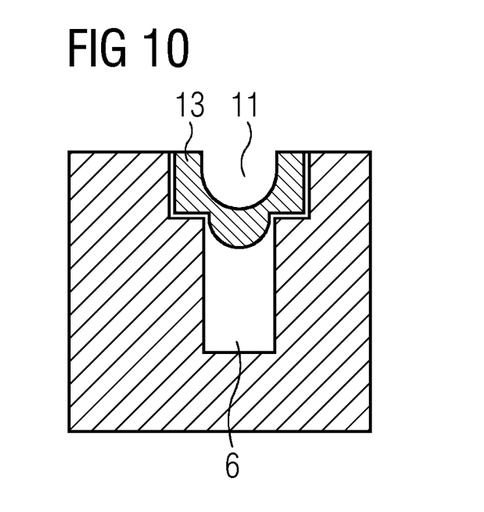
FIG. 10 shows a schematic view of the cross-section of the plug shown in FIG. 7.

FIGS. 8 to 10 show schematic views of the cross-sections of the plugs shown in FIGS. 5 to 7 inserted in insertion holes 6, 7. The plug annular collar of the covers 11 abut the first inner surface of the insertion holes 6, 7. Hence, the covers 11 can be inserted completely in the insertion holes 6, 7, preventing the covers 11 to fall out of the insertion hole 6, 7 during transportation or storage or before coupling the tower sections. Additionally, as the covers 11 sit on the first inner surface of the insertion holes 6, 7, which is an enlarged diameter at the opening of each insertion hole 6, 7, they do not move during transportation or storage or during the punching by the fastener, as the enlarged surface prevents the plug from falling inside the insertion hole 6, 7.

FIGS. 11 to 14 show the coupling process of an inventive coupling assembly 1 comprising a first coupling part 2 and a second coupling part 3. The first coupling part 2 is a first flange 9 of the upper part of the coupling assembly 1. The second coupling part 3 is a second flange 10 of the lower part of the coupling assembly 1.

Figure 11:
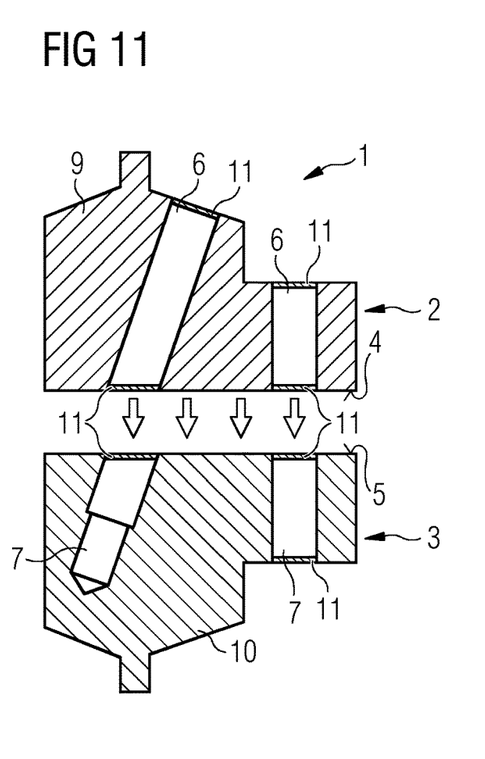
FIG. 11 shows a first step of the coupling process.

FIG. 11 shows the first step of the coupling process. In this step, the first coupling part 2 is lowered towards the second coupling part 3 so that the first surface 4 of the first coupling part 2 abuts the second surface 5 of the second coupling part 3.

Figure 12:
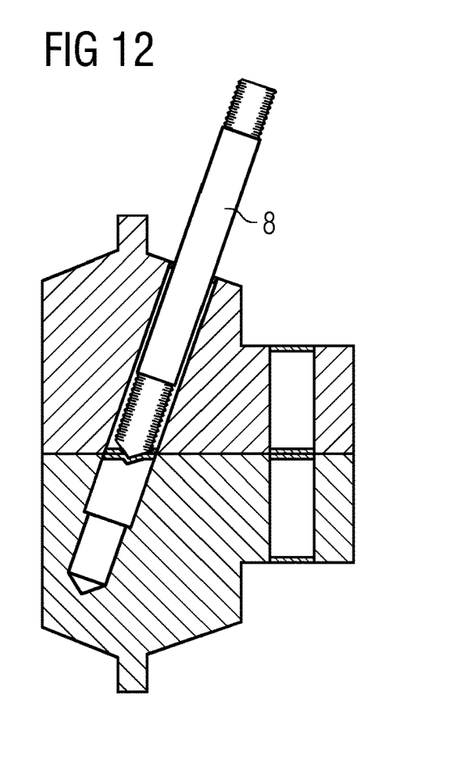
FIG. 12 shows a second step of the coupling process.

FIG. 12 shows the second step of the coupling process. In this step, the fastener 8 is introduced first in a first insertion hole 6 of the first coupling part 2, punching the cover 11 of the insertion hole 6 while the fastener 8 is introduced. Alternatively, the covers 11 could also be punched by a puncher before the second step of the coupling process.

Figure 13:
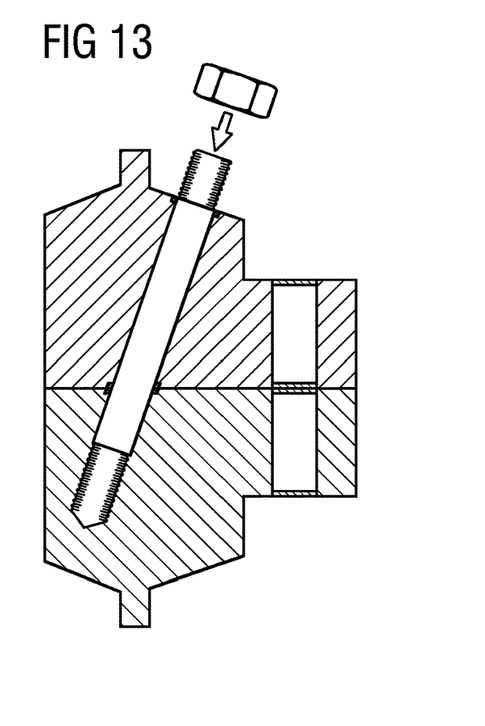
FIG. 13 shows a third step of the coupling process.

FIG. 13 shows the third step of the coupling process. The fastener 8 has a thread at each ending. The thread being introduced in the insertion holes 6, 7 can be fastened to the inner thread of the blind hole of the second insertion hole 7 by rotating the fastener 8 when it reaches the end of the insertion hole 6,7. Hence, the fastener 8 is fastened to the second insertion hole 7 and to the second coupling part 3. In order to fasten the fastener to the first insertion hole 6 of the first coupling part 2, the through-hole can have an inner thread or, as it is the case in this Figure, the fastener 8 can have a thread at the second end for fastening a nut to the fastener and pressing the first and second coupling parts 2, 3 together.

Figure 14:
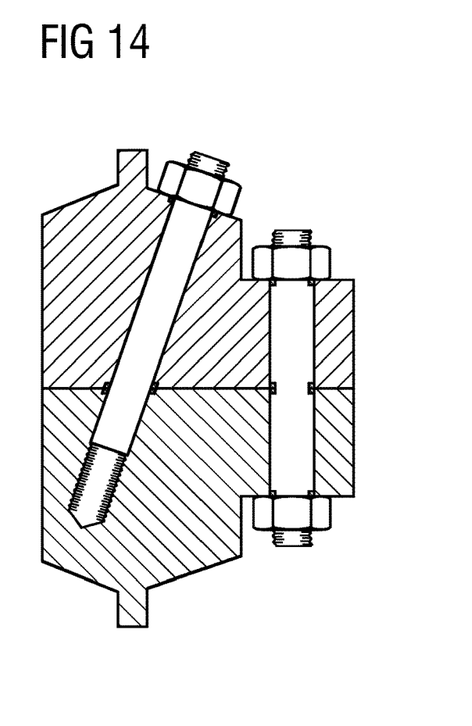
FIG. 14 shows a fourth step of the coupling process.

FIG. 14 shows the fourth and last step of the coupling process. In this step, all the fasteners 8 are inserted in the insertion holes 6, 7 and the coupling assembly is coupled and fastened.

As seen in FIGS. 11 to 14, all the covers 11 of the coupling assembly 1 are configured to be punched by the fasteners 8. Thus, no insertion hole 6, 7 is exposed to the environment at any time. After punching the insertion holes 6, 7, these insertion holes 6, 7 are still protected against the environment, as the fasteners 8 block the openings of the insertion holes 6, 7.

Alternatively, the fastener 8 can be pre-installed in the first insertion hole 6 of the first coupling part 2. In this case, FIG. 12 shows the pre-installed fastener 8 and FIG. 13 and FIG. 14 the introduction and fastening of the pre-installed fastener 8 in the second insertion hole 7 of the second coupling part 3.

Figure 15:
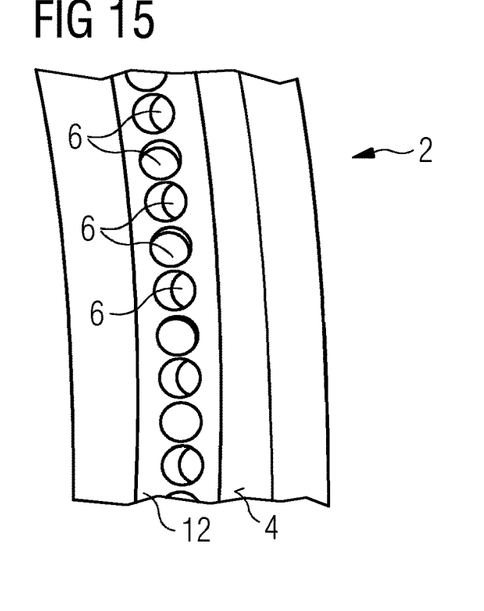
FIG. 15 shows a coupling part of the coupling assembly with an adhesive layer as a cover.

FIG. 15 shows the first coupling part 2 of the coupling assembly 1 with a first surface 4, on which a punch-through adhesive layer 12 is attached, for example by gluing the punch-through adhesive layer 12 on the first surface 4. This punch-through adhesive layer 12 acts as a cover 11 of the first insertion holes 6 by covering a plurality of insertion holes 6. Hence, the same strip of punch-through adhesive layer 12 can be used to cover multiple insertion holes 6, which simplifies the production of the first coupling part 2 covered by such a cover 11. FIG. 15 could also show the second coupling part 3 of the coupling assembly 1 with a second surface 5, on which a punch-through adhesive layer 12 is attached.

Figure 16:
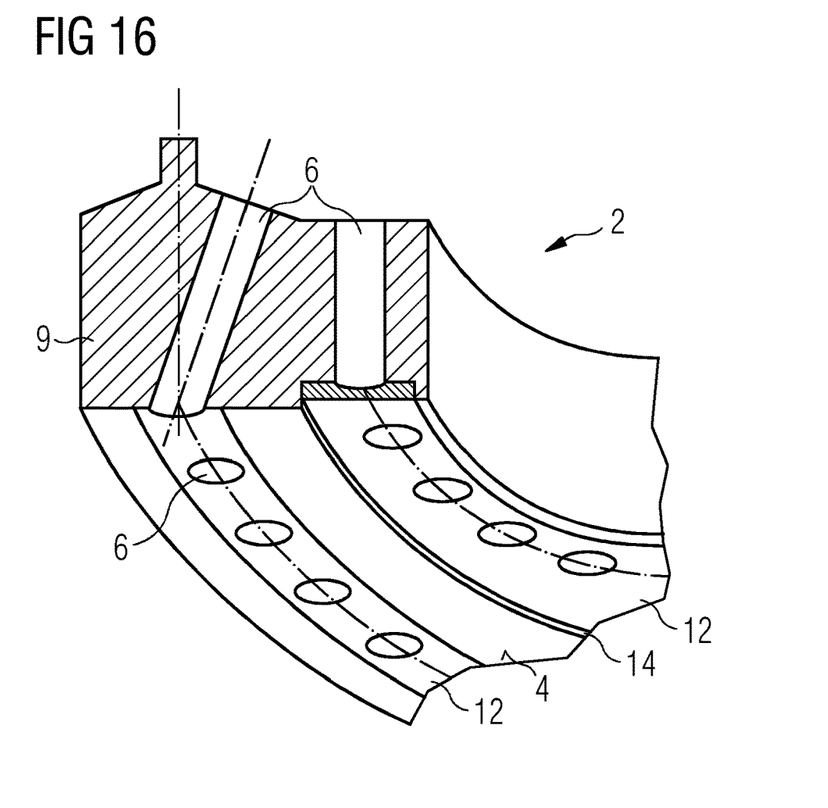
FIG. 16 shows a flange with adhesive layers as covers and a recess.

FIG. 16 shows a similar first flange 9 as the one shown in FIG. 4, but with the difference that the first insertion holes 6 of the left part of the first flange 9 are covered by a punch-through adhesive layer 12, the through-holes of the right part of the first flange 9 are covered by an additional punch-through adhesive layer 12 and that the punch-through adhesive layer 12 of the through-holes of the right part of the first flange 9 is inserted in a recess 14. The recess 14 is installed to protect the adhesive layer 12 from being damaged during transportation, storage, or installation and to enhance the attachment of the adhesive layer 12 on the first surface 4. In this case, the adhesive layer 12 attached in the recess 14 is thicker than the one covering the left insertion holes 6, as the recess protects the adhesive layer 12. It is possible that the adhesive layer 12 has the same thickness as the recess 14 depth, so that the first surface 4 is has a planar surface. This is advantageous to avoid objects getting stuck in the recess 14 and to offer a higher protection with the adhesive layer 12, as a thicker adhesive layer 12 can withstand better impacts. FIG. 16 could also show the second coupling part 3 of the coupling assembly 1 with a second surface 5, on which the punch-through adhesive layer 12 is attached.

Figure 17:
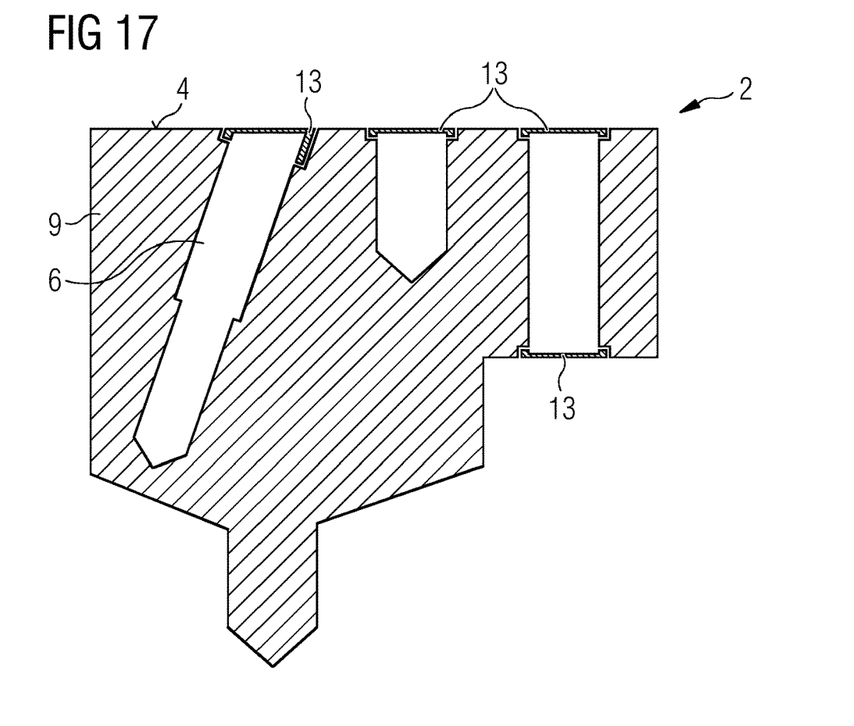
FIG. 17 shows flanges with a first type of cover inserted into the insertion holes.

FIG. 17 shows a further embodiment according to embodiments of the invention of the first flange 9 of the first coupling part 2 of the coupling assembly 1, with a plurality of first insertion holes 6 being all covered by a plurality of covers 11. In this embodiment, the covers 11 are punch-through plugs 13 and the diameter of the openings of the first insertion holes 6 is enlarged so that the punch-through plugs 13 can sit in the opening inside the insertion holes 6. The opening of these first insertion holes 6 is enlarged by drilling along the angle of the first insertion holes 6 and the corresponding punch-through plugs 13 adapted to this geometry of the opening are used.

Figure 18:
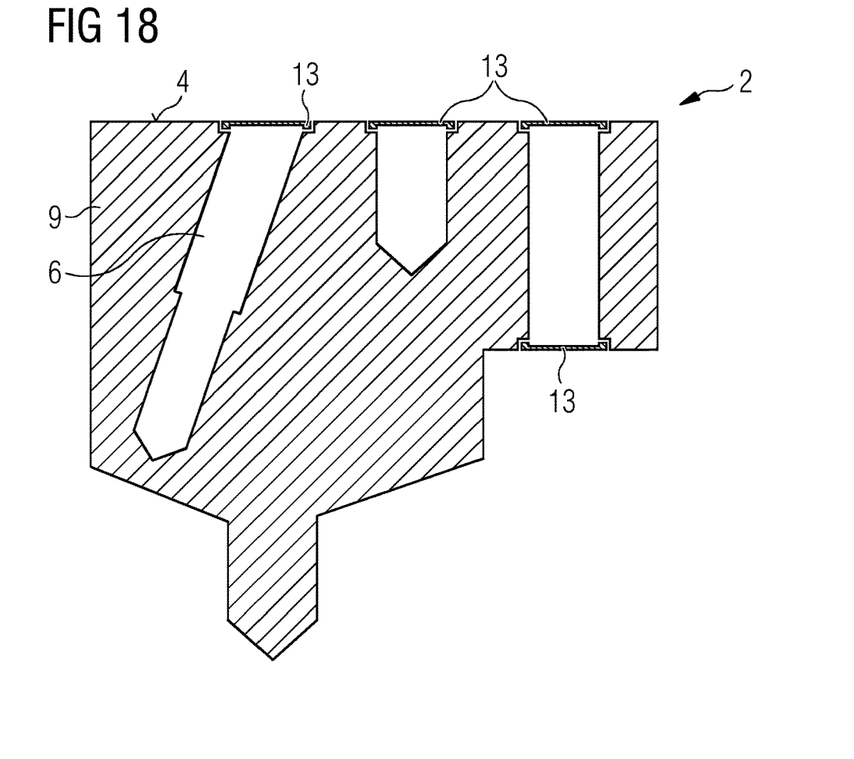
FIG. 18 shows flanges with another type of cover inserted into the insertion holes.

FIG. 18 shows a further embodiment according to embodiments of the invention of the first flange 9 of the first coupling part 2 of the coupling assembly 1, similar to the one shown in FIG. 16, but with the difference that the opening of the first insertion holes 6 is enlarged by drilling perpendicular to the first surface 4 and the corresponding punch-through plugs 13 adapted to this geometry of the opening are used.

Figure 19:
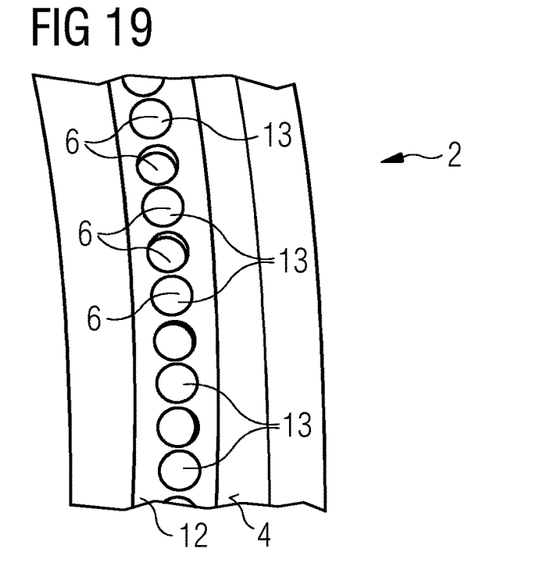
FIG. 19 shows a coupling part of the coupling assembly with a cover combining an adhesive layer and multiple punch-through plugs.

FIG. 19 shows the first coupling part 2 of the coupling assembly 1 with a first surface 4 similar to the one shown in FIG. 14, on which a punch-through adhesive layer 12 comprising a plurality of punch-through plugs 13 is attached. The punch-through plugs 13 are inserted only in the blind holes of the first coupling part 2.

Figure 20:
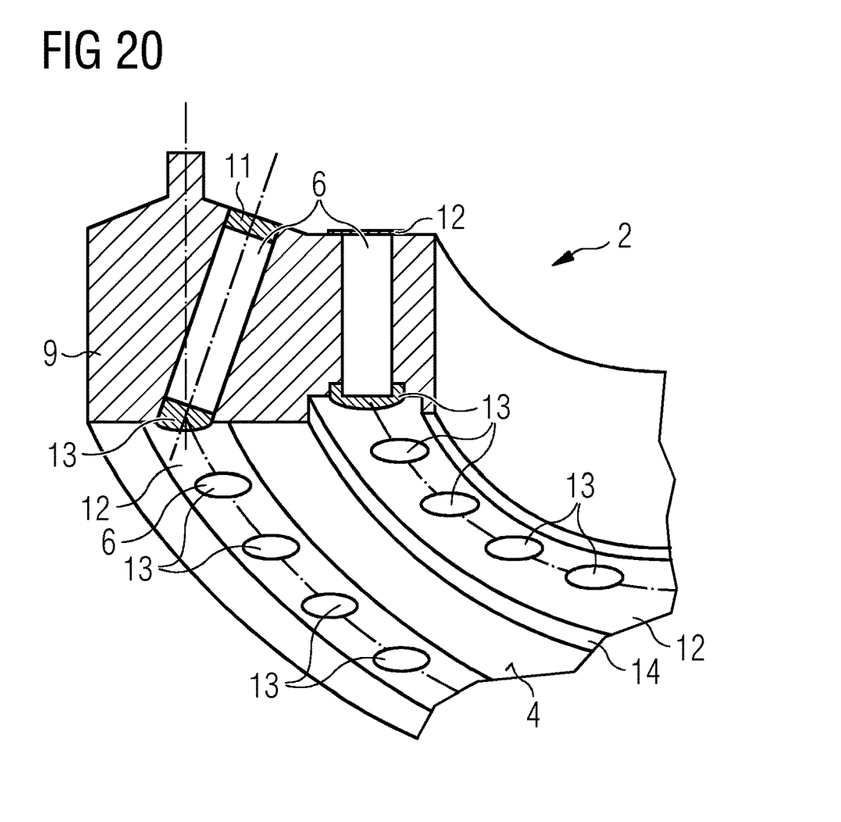
FIG. 20 shows a flange with different types of covers at the insertion holes.

FIG. 20 shows a similar first flange 9 as the one shown in FIG. 15 with a combination of multiple cover types at the openings of all insertion holes. Looking at the cross-section, the top left insertion hole 6 is covered by a plug which is removed during installation, the top right insertion hole 6 is covered by an adhesive layer, the bottom left insertion hole 6 is covered by a cover 11 combining a punch-through adhesive layer 12 and multiple punch-through plugs 13 and the bottom right insertion hole 6 is covered by another cover 11 combining a punch-through adhesive layer 12 and multiple punch-through plugs 13, wherein the insertion holes 6 of this latter cover 11 have openings adapted for the punch-through plugs 13 with an enlarged diameter at the opening of the insertion holes 6, so that the punch-through plugs 13 can sit in the opening inside the insertion hole. Additionally, the punch-through adhesive layer 12 is inserted in a recess 14. Additionally, the punch-through plugs 13 have a weakened central area for facilitating the punching of the punch-through plugs 13.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE NUMBERS

1 Coupling assembly
2 First coupling part
3 Second coupling part
4 First surface
5 Second surface
6 First insertion hole
7 Second insertion hole
8 Fastener
9 First flange
10 Second flange
11 Cover
12 Punch-through adhesive layer
13 Punch-through plug
14 Recess
15 Wind turbine
16 Tower
17 First tower section
18 Second tower section
19 Transition piece
20 Nacelle
21 Hub
22 Blade

The invention claimed is:

1. A coupling assembly of a wind turbine comprising
a first coupling part and a second coupling part,
the first coupling part and the second coupling part being configured to be coupled with each other,
the first coupling part comprising a first surface with a first insertion hole being configured to be inserted by a fastener,
the second coupling part comprising a second surface with a second insertion hole being configured to be inserted by the fastener,
the first surface being configured to abut the second surface,
wherein the first and/or the second insertion hole is covered by a cover that is inserted completely in the first and/or the second insertion hole.

2. The coupling assembly according to claim 1, wherein the first and/or the second insertion hole is a blind hole.

3. The coupling assembly according to claim 1, wherein the first and/or the second insertion hole is a through-hole.

4. The coupling assembly according to claim 1, wherein the first surface and/or the second surface comprises a plurality of first or second insertion holes respectively, wherein a single cover covers the plurality of first or second insertion holes.

5. The coupling assembly according to claim 1, wherein the first coupling part further comprises a first flange, wherein the first surface is a face of the first flange.

6. The coupling assembly according to claim 1, wherein the second coupling part further comprises a second flange, wherein the second surface is a face of the second flange.

7. The coupling assembly according to claim 1, wherein the first surface and/or the second surface comprises a recess enclosing the first and/or second insertion hole.

8. The coupling assembly according to claim 1, wherein the cover is configured to be punched by a puncher before the first coupling part and the second coupling part are coupled together, and wherein the puncher differs from the fastener.

9. The coupling assembly according to claim 1, wherein the cover comprises a plug inserted in the opening of the first and/or second insertion hole.

10. The coupling assembly according to claim 9, wherein the plug has a nose that is dome shaped.

11. The coupling assembly according to claim 9, wherein a diameter of the opening of the first and/or second insertion hole is sufficiently large for the plug to sit in the opening inside the first and/or second insertion hole, wherein the plug comprises a planar annular collar configured to abut an inner surface of the first and/or second insertion hole, and wherein the plug is sitting in the opening inside the first and/or second insertion hole.

12. The coupling assembly according to claim 1, wherein an external surface of the cover is directly exposed to an ambient environment outside of the first and/or the second insertion hole.

13. A method of coupling a first coupling part and a second coupling part of a coupling assembly of a wind turbine according to claim 1, comprising the steps of
bringing the first surface and the second surface together, so that the first surface abuts the second surface,
punching the cover, and
fastening the first coupling part and the second coupling part by the fastener.

14. A tower of a wind turbine, the tower comprising
a first and a second tower section, the first tower section being coupled to the second tower section by a coupling assembly according to claim 1 and connected by the fastener inserted through both the first insertion hole of the first surface pertaining to the first tower section and the second insertion hole of the second surface pertaining to the second tower section.

15. A coupling assembly of a wind turbine comprising
a first coupling part and a second coupling part,
the first coupling part and the second coupling part being configured to be coupled with each other,
the first coupling part comprising a first surface with a first insertion hole being configured to be inserted by a fastener,
the second coupling part comprising a second surface with a second insertion hole being configured to be inserted by the fastener,
the first surface being configured to abut the second surface,
wherein the first and/or the second insertion hole is covered by a cover, and
wherein the cover is configured to be punched by the fastener during fastening the first coupling part and the second coupling part together.

16. The coupling assembly according to claim 15, wherein the cover has a weakened central area configured to break during punching of the cover by the fastener.

17. The coupling assembly according to claim 15, wherein the cover comprises a punch-through adhesive layer configured to cover the first or second insertion hole.

18. The coupling assembly according to claim 15, wherein the cover comprises a punch-through plug inserted in the opening of the first or second insertion hole.

19. The coupling assembly according to claim 15, wherein the cover is a combination of a punch-through adhesive layer and at least one punch-through plug configured to cover the first or second insertion hole.

20. The coupling assembly according to claim 18, wherein a diameter of the opening of the first and/or second insertion hole is sufficiently large for the punch-through plug to sit in the opening inside the first and/or second insertion hole.

\* \* \* \* \*